(12) United States Patent
Wang et al.

(10) Patent No.: US 10,400,428 B2
(45) Date of Patent: Sep. 3, 2019

(54) OUTLET MECHANISM WITH FILTERED WATER AND TAP WATER OUTLET MODES

(71) Applicant: XIAMEN SOLEX HIGH-TECH INDUSTRIES CO., LTD., Xiamen, Fujian (CN)

(72) Inventors: Mingnan Wang, Fujian (CN); Chunjie Hong, Fujian (CN); Wenxing Chen, Fujian (CN)

(73) Assignee: XIAMEN SOLEX HIGH-TECH INDUSTRIES CO., LTD., Xiamen (CN)

(*) Notice: Subject to any disclaimer, the term of this patent is extended or adjusted under 35 U.S.C. 154(b) by 0 days.

(21) Appl. No.: 15/377,544

(22) Filed: Dec. 13, 2016

(65) Prior Publication Data

US 2017/0328044 A1 Nov. 16, 2017

(30) Foreign Application Priority Data

May 16, 2016 (CN) .......................... 2016 1 0324319

(51) Int. Cl.
*E03C 1/04* (2006.01)
*B01D 35/04* (2006.01)

(52) U.S. Cl.
CPC ............ *E03C 1/0404* (2013.01); *B01D 35/04* (2013.01); *B01D 2201/16* (2013.01); *E03C 2201/40* (2013.01); *E03C 2201/45* (2013.01)

(58) Field of Classification Search
USPC ........................................................ 137/801
See application file for complete search history.

(56) References Cited

U.S. PATENT DOCUMENTS 7,314,189 B2 * 1/2008 Nobili ................... E03C 1/0409
239/549
2007/0235091 A1 * 10/2007 Granot .................. E03O 1/0404
137/597

* cited by examiner

*Primary Examiner* — Jessica Cahill
*Assistant Examiner* — Daphne M Barry
(74) *Attorney, Agent, or Firm* — Rabin & Berdo, P.C.

(57) ABSTRACT

An outlet mechanism with filtered water and tap water outlet modes includes: an inlet body and an outlet body; the inlet body is connected to the outlet body, which is disposed independently with a tap water outlet passage and a filtered water outlet passage inside; a first outlet control switch an a second outlet controls switch being respectively used to control the open and close of the tap water outlet passage and the filtered water outlet passage; the first outlet control switch is disposed on the inlet body, the second outlet control switch is disposed on the outlet body; and an outlet device being disposed independently at the end of the outlet body with a first outlet and a second outlet; the first outlet and the second outlet are respectively connected to the tap water outlet passage and the filtered water outlet passage.

9 Claims, 8 Drawing Sheets

OUTLET MECHANISM WITH FILTERED WATER AND TAP WATER OUTLET MODES

FIELD OF THE INVENTION

The present invention relates to an outlet mechanism, particularly to an outlet mechanism with filtered water and tap water outlet modes.

BACKGROUND OF THE INVENTION

Taps are widely used in washrooms of families, hotels, restaurants, or in basins and water tanks of kitchens. People cares more and more about the health, water for cooking, washing fruits and vegetables and drinking needs to be filtered to use. There are taps with filtering function in the market. However, these taps only outlet filtered water. Water for washing products, hands or clothes needn't to be filtered. This kind of filtering tap with single function in long and high frequency usage would shorten the filtering element's service life, resulting in a waste of resource.

SUMMARY OF THE INVENTION

The present invention is provided with an outlet mechanism with filtered water and tap water outlet modes, which applies two independent outlet switches to respectively control two outlet modes to reduce the occurring of misoperation.

The technical solution of the present invention is that:

An outlet mechanism with filtered water and tap water outlet modes, wherein comprising:

an inlet body and an outlet body; the inlet body is connected to the outlet body, which is disposed independently with a tap water outlet passage and a filtered water outlet passage inside;

a first outlet control switch an a second outlet controls switch being respectively used to control the open and close of the tap water outlet passage and the filtered water outlet passage; the first outlet control switch is disposed on the inlet body, the second outlet control switch is disposed on the outlet body; and an outlet device being disposed at the end of the outlet body; the outlet device is disposed independently with a first outlet and a second outlet; the first outlet and the second outlet are respectively connected to the tap water outlet passage and the filtered water outlet passage.

In another preferred embodiment, the outlet body comprises a support pipe and an outlet joint component; the support pipe is connected between the outlet joint component and the inlet body; the front end of the outlet joint component is disposed with a tap water flowing hole and a filtered water flowing hole, which form the tap water outlet passage and the filtered outlet passage; the end of the outlet joint component is disposed with a first opening; the side wall of the outlet joint component is further disposed with a second outlet vertical to the side wall.

In another preferred embodiment, the second outlet control switch comprises a switch valve component and a switch valve button; the switch valve component is disposed in the outlet joint component, the switch valve button is connected to one end of the switch valve component in transmitting way and is exposed out of the first opening.

In another preferred embodiment, the switch valve component is further disposed with a sealing element; when the switch valve button is pressed, the sealing element moves in the switch valve component, such that the filtered water flowing hole is connected to the second opening or is closed by the sealing element.

In another preferred embodiment, it comprises one or more tap water flowing hole.

In another preferred embodiment, the switch valve component further comprises a push bar, one end of the push bar is connected to the switch valve button in transmitting way, the side wall of the other end is arranged with protruding blocks with interval, the end of the protruding block is configured to be an incline surface.

In another preferred embodiment, the sealing element is coaxial to the push bar, the sealing element is disposed with a sealing ring vertical to the axial direction; the side of the sealing ring faced to the push bar is disposed with a plurality of bosses; the side of the boss faced to the protruding block is disposed with a guiding surface coupled to the incline surface.

In another preferred embodiment, the outlet device is disposed in the second opening; the first outlet and the second outlet are arranged in surrounding way, the first outlet surrounds the external periphery of the second outlet.

In another preferred embodiment, the inlet body comprises a body base and an independent valve spool base disposed in the body base;

the independent valve spool base is disposed independently with a filtered water inlet and a tap water inlet, the filtered water inlet is connected to the filtered water outlet passage; the side wall of the independent valve spool base is disposed with a tap water outlet; the first outlet control switch is disposed between the tap water outlet and the tap water flowing hole; when the first outlet control switch is switched on or off, the tap water outlet is connected or disconnected to the tap water flowing hole.

In another preferred embodiment, it comprises two tap water inlets: a cool water inlet and a hot water inlet.

Compared to the traditional technology, the technical solution of the present invention has following advantages:

1. The outlet mechanism with filtered water and tap water outlet modes is provided that it comprises independent first outlet control switch and second outlet control switch to respectively control the tap water outlet and filtered water outlet; in addition, the first outlet control switch is disposed on the inlet body, the second outlet control switch is disposed on the outlet body, such that the user can separate the two switches clearly, thus efficiently avoiding misoperation.
2. Above mentioned outlet mechanism with filtered water and tap water outlet modes is provided that the filtered water ad the tap water share one outlet device, the outlet device is disposed with independent filtered water outlet and tap water outlet, such to guarantee an clean and attractive appearance of the outlet mechanism and to ensure the outlet waterways of the filtered water and the tap water not influencing each other, thus ensuring the outlet consistency of each outlet mode.

DETAILED DESCRIPTION OF THE EMBODIMENTS

The present invention will be further descried with the drawings and the embodiment.

Figure 1:
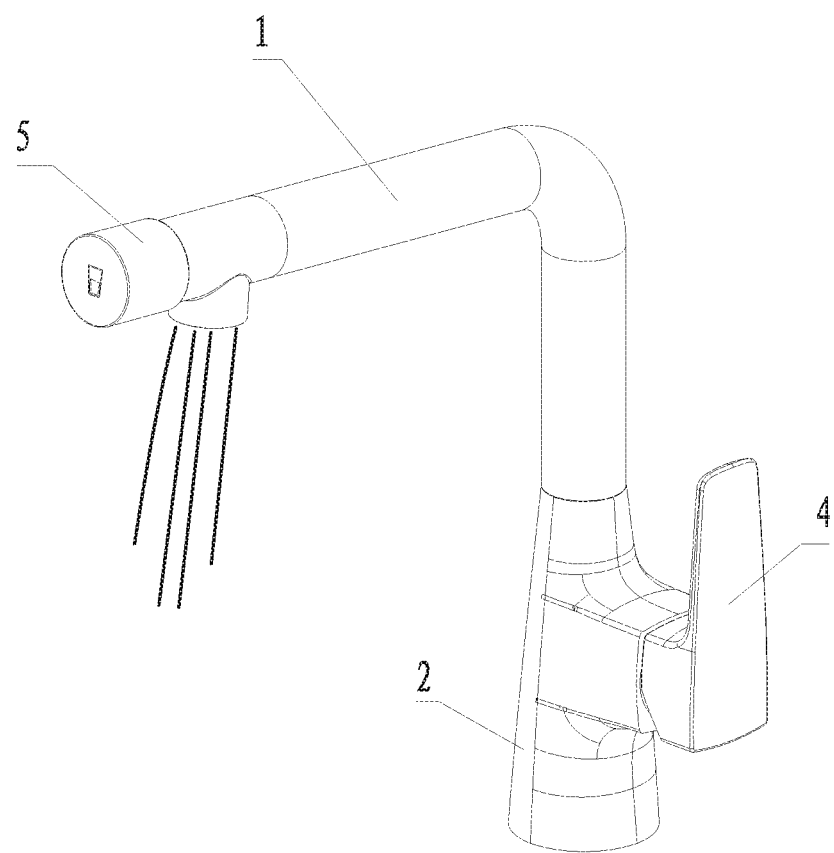
FIG. 1 illustrates a schematic diagram of an outlet mechanism of a preferred embodiment of the present invention.
Figure 2:
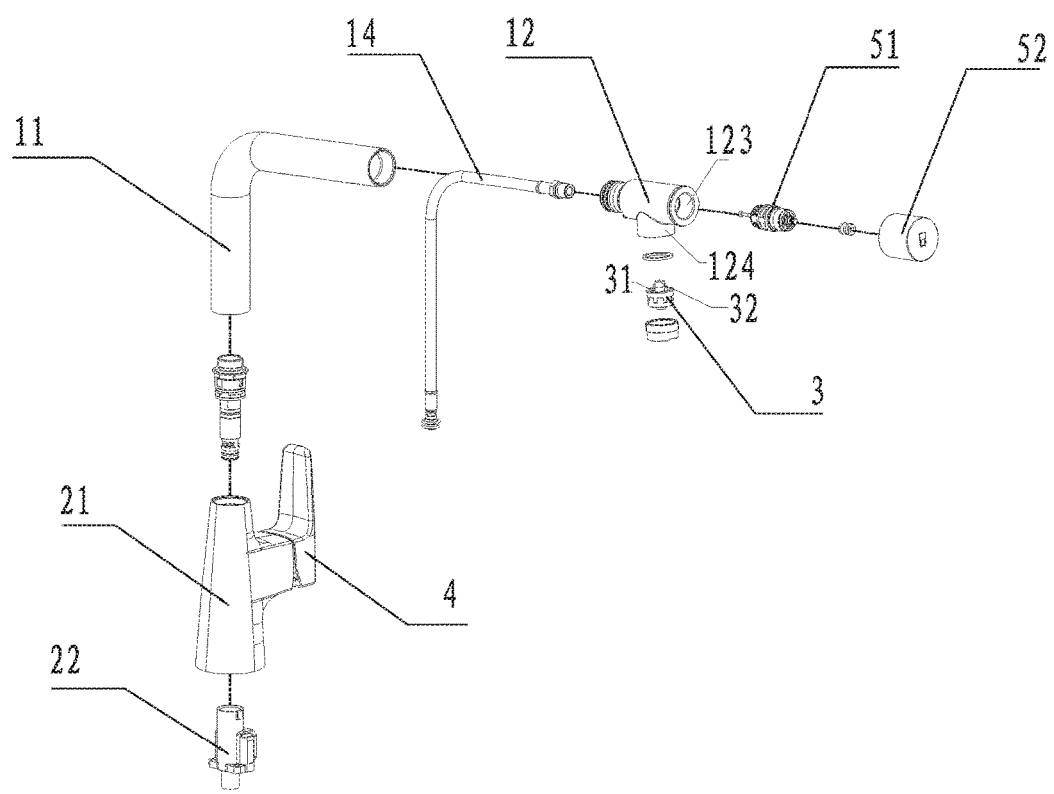
FIG. 2 illustrates an exploded and schematic diagram of the outlet mechanism of the preferred embodiment of the present invention.
Figure 3:
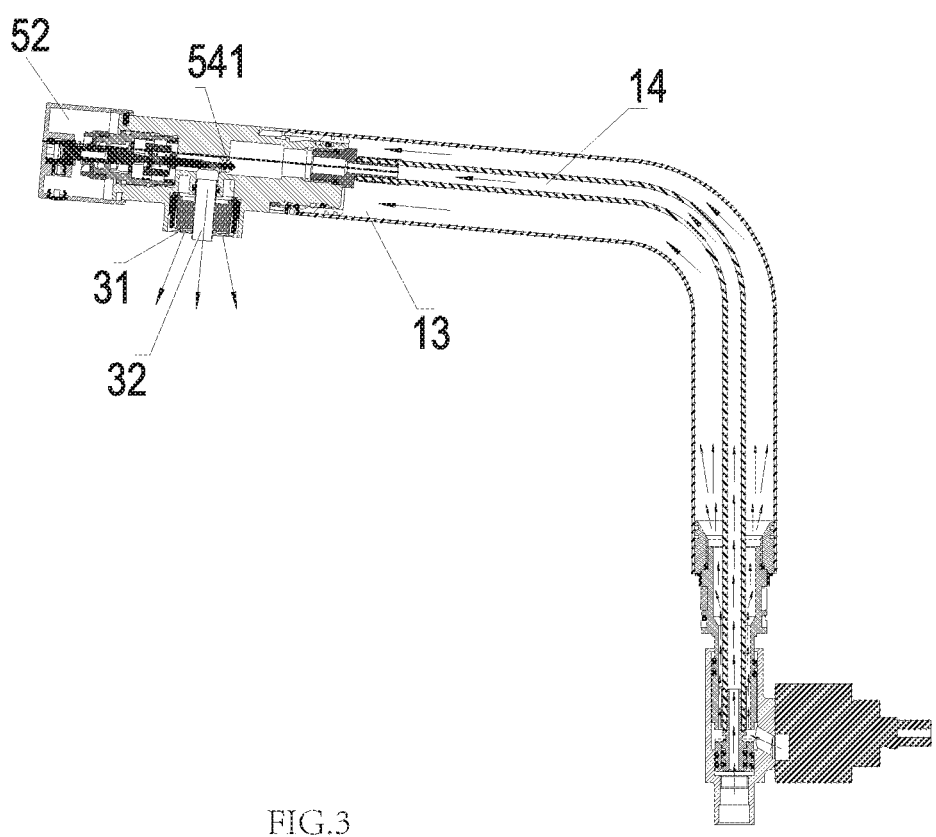
FIG. 3 illustrates a sectional diagram of the outlet mechanism with waterways of the preferred embodiment of the present invention.
Figure 4:
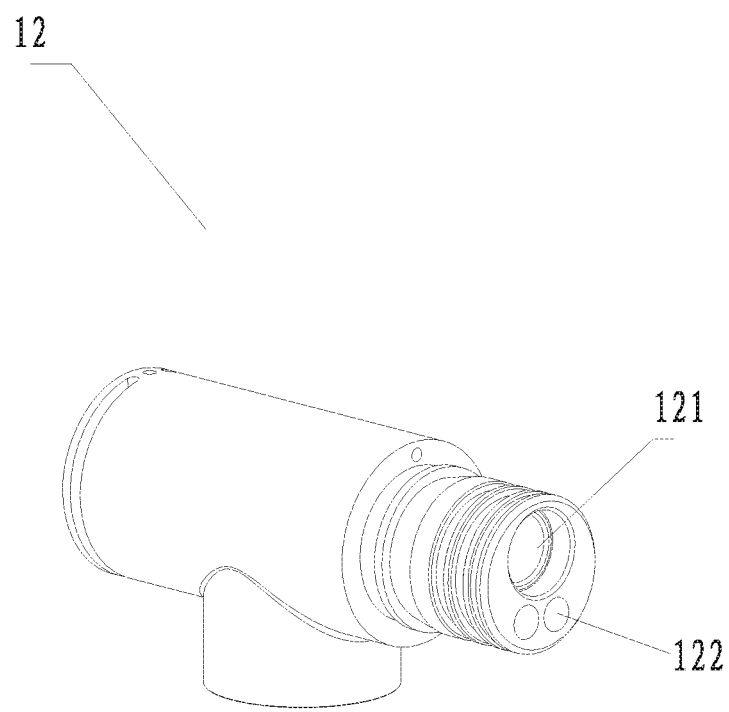
FIG. 4 illustrates a schematic diagram of an outlet joint component of the preferred embodiment of the present invention.
Figure 5:
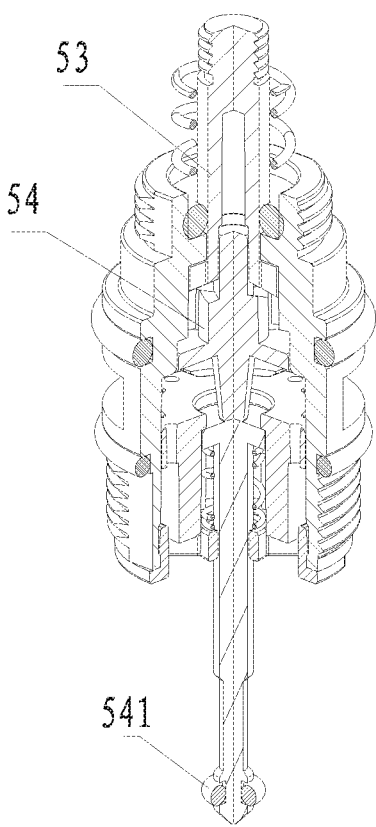
FIG. 5 illustrates a schematic diagram of a switch valve component of the preferred embodiment of the present invention.
Figure 6:
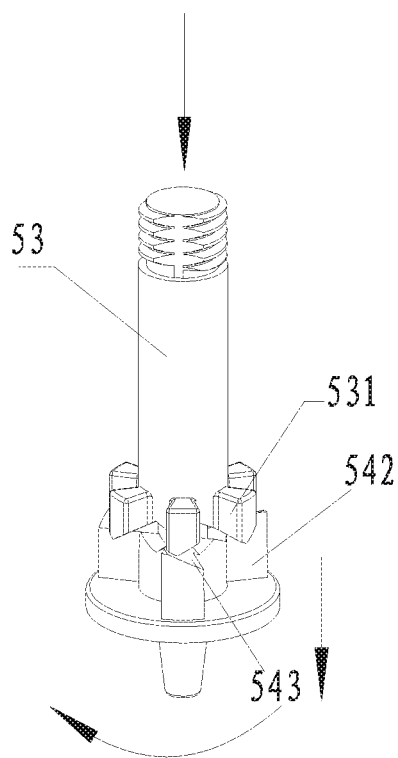
FIG. 6 illustrates a schematic diagram of a push bar and a sealing element of the switch valve component of the preferred embodiment of the present invention.
Figure 7:
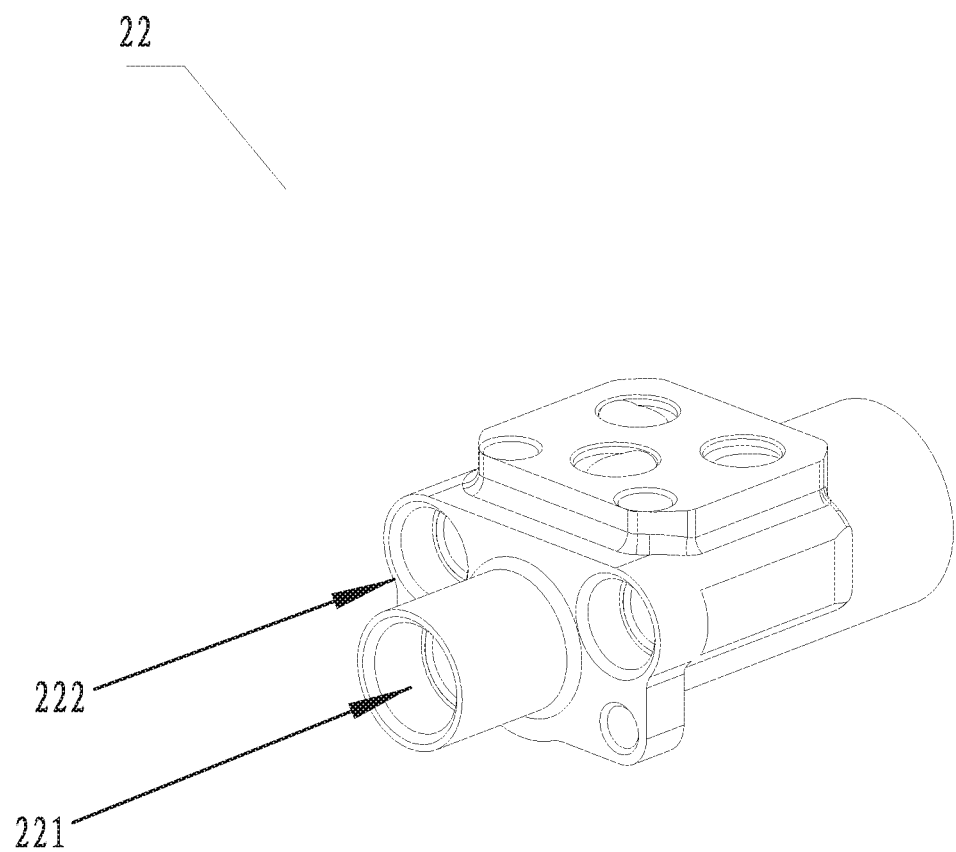
FIG. 7 illustrates a schematic diagram of an independent valve spool base of the preferred embodiment of the present invention.
Figure 8:
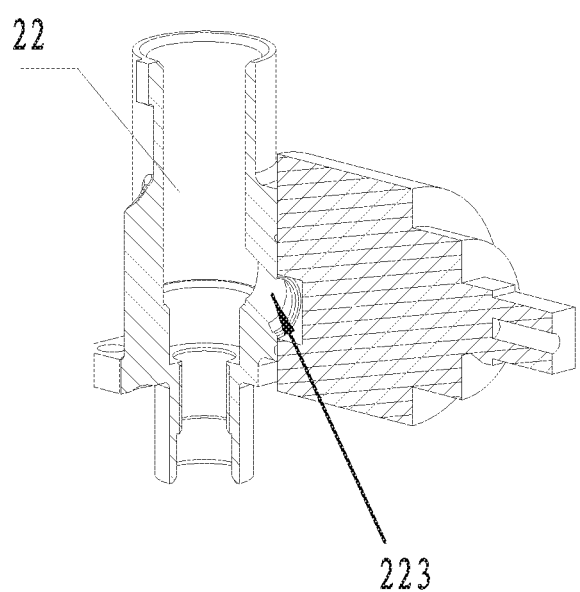
FIG. 8 illustrates a sectional diagram of the independent valve spool base and a first outlet control switch of the preferred embodiment of the present invention.

Referring to FIGS. 1-8, an outlet mechanism with filtered water and tap water outlet modes comprises:

An inlet body 2, an outlet body 1, an outlet device 3, a first outlet control switch 4 and a second outlet control switch 5; the inlet body 2 is connected to the outlet body 1, which is disposed independently with a tap water outlet passage 13 and a filtered water outlet passage 14 inside;

The outlet body 1 comprises a support pipe 11 and an outlet joint component 12; the support pipe 11 is connected between the outlet joint component 12 and the inlet body 2; the front end of the outlet joint component 12 is disposed with a tap water flowing hole 122 and a filtered water flowing hole 121, which form the tap water outlet passage 13 and the filtered outlet passage 14; the end of the outlet joint component 12 is disposed with a first opening 123; the side wall of the outlet joint component 12 is further disposed with a second outlet 124 vertical to the side wall.

The outlet device 3 is disposed in the second opening 124, the outlet device 3 is disposed independently with a first outlet 31 and a second outlet 32; the first outlet 31 and the second outlet 32 are respectively connected to the tap water outlet passage 13 and the filtered water outlet passage 14. In this embodiment, the first outlet 31 and the second outlet 32 are arranged in surrounding way, the first outlet 31 surrounds the external periphery of the second outlet 32.

The first outlet control switch 4 is disposed on the inlet body 2, the second outlet control switch 5 is disposed on the outlet body 1; the switches are respectively used to control the open and close of the tap water outlet passage 13 and the filtered water outlet passage 14.

The second outlet control switch 5 comprises a switch valve component 51 and a switch valve button 52; the switch valve component 51 is disposed in the outlet joint component 12, the switch valve button 52 is connected to one end of the switch valve component 51 in transmitting way and is exposed out of the first opening 123.

The switch valve component 51 is further disposed with a push bar 53 and a sealing element 54, one end of the push bar 53 is connected to the switch valve button 52 in transmitting way, the side wall of the other end is arranged with protruding blocks 531 with interval, the end of the protruding block 531 is configured to be an incline surface.

The sealing element 54 is coaxial to the push bar 53, the sealing element 54 is disposed with a sealing ring 541 vertical to the axial direction; the side of the sealing ring 541 faced to the push bar is disposed with a plurality of bosses 542; the side of the boss 542 faced to the protruding block 531 is disposed with a guiding surface 543 coupled to the incline surface.

When the switch valve button 52 is pressed, the guiding surface 543 is coupled to the incline surface of the end of the protruding block 531, the sealing element 54 is pushed to move in the switch valve component 51, such that the filtered water flowing hole 121 is connected to the second opening 124, this outlet mode is filtered water. When the switch valve button 52 is pressed again, the sealing element 54 repositions, the filtered water flowing hole 121 is disconnected to the second opening 124.

The inlet body 2 comprises a body base 21 and an independent valve spool base 22 disposed in the body base 21;

The independent valve spool base 22 is disposed independently with a filtered water inlet 221 and a tap water inlet 222, the filtered water inlet 221 is connected to the filtered water outlet passage 14; the side wall of the independent valve spool base is disposed with a tap water outlet 223; the first outlet control switch 4 is disposed between the tap water outlet 223 and the tap water flowing hole 122; when the first outlet control switch 4 is switched on or off, the tap water outlet 223 is connected or disconnected to the tap water flowing hole 122. Therefore, the tap water outlet passage 13 is controlled by the first outlet control switch 4.

In this embodiment, it comprises two tap water inlets 222: a cool water inlet and a hot water inlet. The outlet temperature of the tap water outlet passage 13 is adjustable, which satisfies the requirement and using habit.

In this embodiment, it comprises one or more than one tap water flowing hole. The number of the tap water outlet passage 13 is one or more than one as well, two preferred, such to guarantee the outlet volume of the tap water.

The outlet mechanism with filtered water and tap water outlet modes is provided that it comprises independent first outlet control switch and second outlet control switch to respectively control the tap water outlet and filtered water outlet; in addition, the first outlet control switch is disposed on the inlet body, the second outlet control switch is disposed on the outlet body, such that the user can separate the two switches clearly, thus efficiently avoiding misoperation.

In addition, above mentioned outlet mechanism with filtered water and tap water outlet modes is provided that the filtered water ad the tap water share one outlet device, the outlet device is disposed with independent filtered water outlet and tap water outlet, such to guarantee an clean and attractive appearance of the outlet mechanism and to ensure the outlet waterways of the filtered water and the tap water not influencing each other, thus ensuring the outlet consistency of each outlet mode.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

The invention claimed is:

1. An outlet mechanism with filtered water and tap water outlet modes, comprising:
   an inlet body and an outlet body;
   the inlet body being connected to the outlet body;
   the outlet body enclosing a tap water outlet passage and a filtered water outlet passage, at least a part of the filtered water outlet passage being coaxial with the tap water outlet passage;

a first outlet control switch and a second outlet control switch being respectively used to control an open and close of the tap water outlet passage and the filtered water outlet passage;

wherein:

the first outlet control switch is disposed on the inlet body, and the second outlet control switch is disposed on the outlet body;

an outlet device is disposed at an end of the outlet body;

the outlet device is disposed independently with a first outlet and a second outlet;

the first outlet and the second outlet are respectively connected to the tap water outlet passage and the filtered water outlet passage;

the outlet body comprises a support pipe and an outlet joint component;

the support pipe is connected between the outlet joint component and the inlet body;

a front end of the outlet joint component is disposed with a tap water flowing hole and a filtered water flowing hole, which form the tap water outlet passage and the filtered water outlet passage;

an end of the outlet joint component is disposed with a first opening; and a side wall of the outlet joint component is further disposed with a second outlet vertical with respect to the side wall.

2. The outlet mechanism with filtered water and tap water outlet modes according to claim 1, wherein the second outlet control switch comprises a switch valve component and a switch valve button;

the switch valve component is disposed in the outlet joint component, and the switch valve button is connected to one end of the switch valve component in transmitting way and is exposed out of the first opening.

3. The outlet mechanism with filtered water and tap water outlet modes according to claim 2, wherein the switch valve component is further disposed with a sealing element; and when the switch valve button is pressed, the sealing element moves in the switch valve component, such that the filtered water flowing hole is connected to a second opening or is closed by the sealing element.

4. The outlet mechanism with filtered water and tap water outlet modes according to claim 3, wherein the switch valve component further comprises a push bar, one end of the push bar is connected to the switch valve button in a transmitting way, a side wall of another end of the push bar is arranged with protruding blocks at intervals, and an end of a protruding block is configured to be an inclined surface.

5. The outlet mechanism with filtered water and tap water outlet modes according to claim 4, wherein the sealing element is coaxial with the push bar, the sealing element is disposed with a sealing ring vertical with respect to an axial direction;

a side of the sealing ring facing the push bar is disposed with a plurality of bosses; and a side of a boss facing the protruding block is disposed with a guiding surface coupled to the inclined surface.

6. The outlet mechanism with filtered water and tap water outlet modes according to claim 3, wherein the outlet device is disposed in the second opening; the first outlet and the second outlet are arranged in a surrounding way, and the first outlet surrounds an external periphery of the second outlet.

7. The outlet mechanism with filtered water and tap water outlet modes according to claim 2, comprising one or more tap water flowing holes.

8. The outlet mechanism with filtered water and tap water outlet modes according to claim 7, wherein the inlet body comprises a body base and an independent valve spool base disposed in the body base;

the independent valve spool base is disposed independently with a filtered water inlet and a tap water inlet, the filtered water inlet is connected to the filtered water outlet passage;

a side wall of the independent valve spool base is disposed with a tap water outlet;

the first outlet control switch is disposed between the tap water outlet and the tap water flowing hole; and when the first outlet control switch is switched on or off, the tap water outlet is connected or disconnected to the tap water flowing hole.

9. The outlet mechanism with filtered water and tap water outlet modes according to claim 8, comprising a cool water inlet and a hot water inlet.

* * * * *